June 9, 1936. A. SUBIA 2,043,598
ADJUSTABLE TOOL HOLDER
Filed April 1, 1935
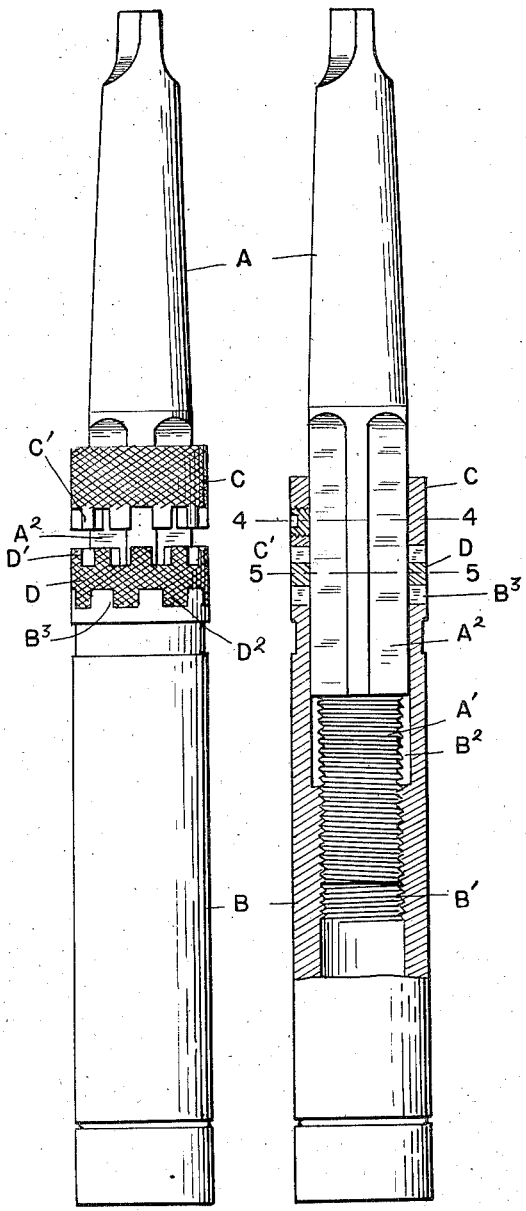
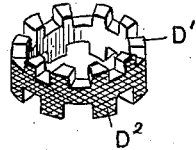
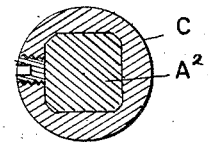
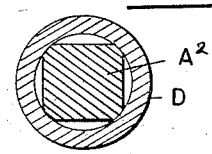
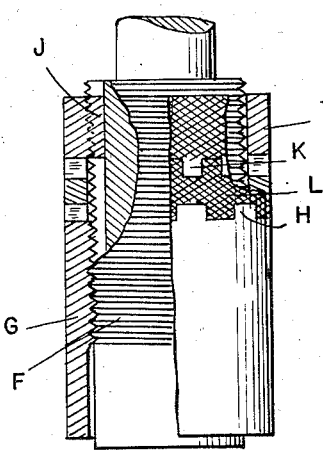
*INVENTOR*
ANTON SUBIA
*ATTORNEYS*

Patented June 9, 1936

2,043,598

UNITED STATES PATENT OFFICE 2,043,598

ADJUSTABLE TOOL HOLDER

Anton Subia, Detroit, Mich., assignor to Eclipse Counterbore Company, Detroit, Mich., a corporation of Michigan Application April 1, 1935, Serial No. 14,172

9 Claims. (Cl. 287—62)

The invention relates to adjustable tool holders and more particularly to that type used in connection with multiple drill presses as well as for other purposes in which the length of the holder or shank may be varied. It is the object of the present invention to obtain a construction which is capable of finer adjustment and which at the same time is of a rugged nature. To this end the invention consists in the construction as hereinafter set forth.

In the drawing:

Fig. 1 is a side elevation of my improved tool holder;

Fig. 2 is a longitudinal section therethrough;

Fig. 3 is a perspective view of the differential locking sleeve;

Figs. 4 and 5 are cross sections respectively on lines 4—4 and 5—5, Fig. 2;

Fig. 6 shows my improvement applied to a stop sleeve construction.

The type of adjustable tool holder to which my improvements are applied consists essentially of a driving member A adapted for engagement with the spindle of the drill press and a socketed driven member B having a threaded engagement with said driving member. This threaded engagement permits of adjustment to alter the total length of the holder, but inasmuch as the driving torque must be transmitted from the driving member to the driven member, these parts are normally locked from relative rotation. Heretofore constructions have been devised in which the locking of the two members is effected by a sleeve or collar non-rotatively but longitudinally slidably mounted on one member, said collar having clutch teeth for engaging cooperating clutch teeth on the other of said members. It is necessary that these clutch teeth should be of a substantial nature so as to safely transmit the driving torque and thus the number of teeth that can be placed around the circumference of the collar is limited. This determines the number of adjustments in one revolution while the pitch of the thread forming the engagement between the drive and driven members determines the longitudinal adjustment for each revolution. The pitch or fineness of the thread is determined by practical considerations, as too fine a thread would diminish the strength of the tool. Thus the minimum adjustment is determined by the two factors, first, the pitch of the thread and second, the number of teeth in the locking engagement.

To provide for a finer adjustment without diminishing the strength of the structure, I have devised a locking means including an intermediate toothed member having a differential engagement with the toothed members respectively on the driving and driven members, the construction being as follows:

The driving member A has the threaded portion A' and a square or polygonal portion $A^2$. The driven member B has the threaded portion B' and a counterbored portion $B^2$ in which the square or polygonal portion $A^2$ of the member A has clearance for rotation. C is a sleeve or collar slidably fitting the polygonal portion $A^2$ so as to be rotatively driven thereby, but free for longitudinal adjustment. D is another collar which is rotatable upon the polygonal portion $A^2$, the latter preferably having arc shaped bearing portions intermediate adjacent sides. The collars C and D are provided with corresponding teeth C', D', for inter-engagement. The collar D and the member B are also provided with corresponding inter-engageable teeth $B^3$ and $D^2$. These teeth are not, however, the same in number as in the inter-engageable teeth D' and C'. Thus as an example and as specifically shown there are eight inter-engageable teeth $B^3$, $D^2$ in the circular series and ten inter-engageable teeth C', D' in the circular series. This permits four adjustments of the teeth C', D' intermediate each adjustment of the teeth $D^2$, $B^3$, thereby increasing the total number of adjustments in each revolution from eight to thirty-two. Thus for example, if the pitch of the thread is twenty to the inch, thirty-two adjustments can be made for each thread, or six hundred and forty adjustments to the inch of longitudinal advancement. In other words, each individual adjustment is approximately .0015 of an inch. By changing the number of teeth and also by using more than one intermediate sleeve with differential teeth, an adjustment may be made to any degree of fineness desired.

In the modified construction shown in Fig. 6 the tool holder F is provided with a stop sleeve G having a threaded engagement therewith permitting of relative longitudinal adjustment. This adjustment is controlled by a similar differential locking mechanism comprising a circular series of clutch teeth H on the sleeve G. A sleeve I is splined to the member F as indicated at J to hold the same from relative rotational movement while permitting relative longitudinal movement, said sleeve having a differential circular series of clutch teeth K. L is an intermediate sleeve member having clutch teeth at its opposite ends respectively complementary to the teeth H and K. With this construction the sleeve G may be finely adjusted in the same manner as previously described.

One advantage of the construction is that it does not materially increase the external diameter of the tool holder. Thus it is applicable where there are multiple operations on the same part closely located as to center distances and requiring finished surfaces on the same plane. By means of this adjusting mechanism a minimum of center distance can be maintained.

What I claim as my invention is:

1. In a tool holder, the combination of a driving member and a driven member secured in axial alignment with each other, screw threaded means for adjusting one of said members axially with respect to the other, and differential adjustment means for actuating said screw threaded means normally locked by gravity against accidental displacement.

2. In a tool holder, the combination of a driving member and a driven member secured in axial alignment with each other, screw threaded means for adjusting one of said members axially with respect to the other, and differential adjustment means for said screw threaded means including a sleeve surrounding said members and rotatively adjustable thereon and gravity actuated means for locking said sleeve from displacement.

3. In a tool holder, the combination of a driving member and a driven member secured in axial alignment and having a threaded engagement with each other, of a rotatively adjustable sleeve intermediate said drive and driven members having a differential toothed locking engagement therewith.

4. In a tool holder, the combination of a driving member and a driven member secured in axial alignment and having a threaded engagement with each other, of a sleeve longitudinally slidable but rotatively fixed on one of said drive and driven members having a circular series of clutch teeth at one end thereof, an opposed differential circular series of clutch teeth in fixed relation to the other one of said drive and driven members, and an intermediate sleeve having at its opposite ends clutch teeth complementary to the clutch teeth on said drive and driven members.

5. In a tool holder, the combination of a driving member and a driven member secured in axial alignment and having a threaded engagement with each other, of a sleeve rotatively fixed but longitudinally slidable upon one of said drive and driven members, said sleeve having a circular series of clutch teeth at one end thereof, and opposed differential circular series of clutch teeth on the other one of said drive and driven members, a sleeve intermediate said opposed series of clutch teeth and provided at its opposite ends with circular series of teeth complementary respectively to the teeth of the aforesaid series, and means for locking said first mentioned sleeve from longitudinal movement when said complementary clutch teeth are in engagement.

6. In a tool holder, the combination of a driving member and a driven member in axial alignment with each other, a screw threaded shank on one of said members engaging a screw threaded socket in the other of said members, a sleeve longitudinally slidable but rotatively fixed upon the member having said screw threaded shank, said sleeve being provided with a circular series of clutch teeth at one end thereof, an opposed differential circular series of clutch teeth on the member having said screw threaded socket, a sleeve longitudinally and rotatively adjustable on the member having the screw threaded shank and provided at its opposite ends with clutch teeth respectively complementary to the clutch teeth of said opposed series.

7. In a tool holder, the combination of a driving member and a driven member secured in axial alignment and having a threaded engagement with each other, a rotatively adjustable sleeve intermediate said drive and driven members and differential series of locking teeth at opposite ends of said sleeve engaging complementary teeth respectively on said drive and said driven members, the engaging faces of said teeth being within the angle of friction with respect to the rotary drive.

8. In a tool holder, the combination of a driving member and a driven member secured in axial alignment and having a threaded engagement with each other, and one or more adjustable sleeves intermediate said drive and driven members having a differential toothed locking engagement therewith.

9. In a tool holder, the combination of a driving member and a driven member in axial alignment with each other, one being provided with a screw threaded portion and a polygonal portion, the other having a screw threaded socket for engaging said screw threaded portion and a cylindrical portion for receiving said polygonal portion, a sleeve longitudinally slidable on said polygonal portion and provided at one end with a circular series of clutch teeth, a differential circular series of clutch teeth on the end of said socket portion, and a sleeve intermediate the aforesaid sleeve and said socket portion rotatively engaging said polygonal portion and provided with clutch teeth at its opposite ends respectively complementary with the clutch teeth on the aforesaid sleeve and said socket member.

ANTON SUBIA.